(No Model.) 2 Sheets—Sheet 1.

G. McG. LAWRANCE.
APPARATUS FOR TREATING ANIMALS BY ELECTRICITY.

No. 409,470. Patented Aug. 20, 1889.

Witnesses:
J. A. Rutherford
Percy B. Hill

Inventor.
Georgina McGuire Lawrance
By James L. Norris
Attorney

N. PETERS, Photo-Lithographer, Washington, D. C.

(No Model.) 2 Sheets—Sheet 2.
G. McG. LAWRANCE.
APPARATUS FOR TREATING ANIMALS BY ELECTRICITY.
No. 409,470. Patented Aug. 20, 1889.
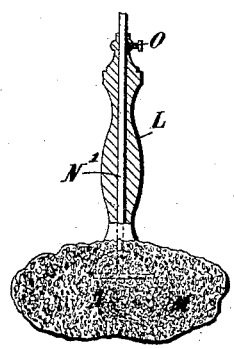
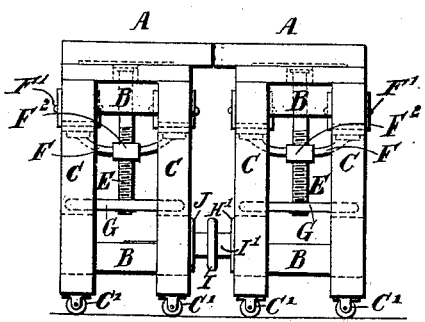
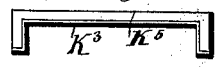
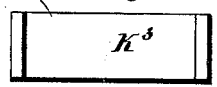
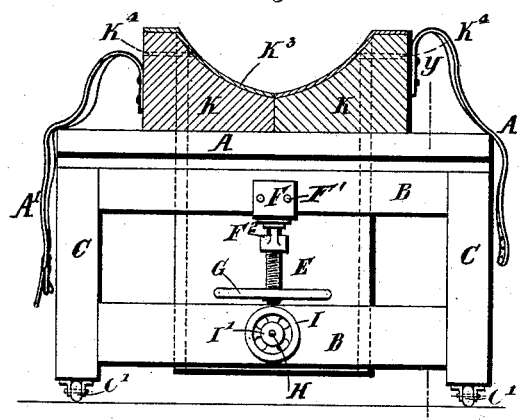
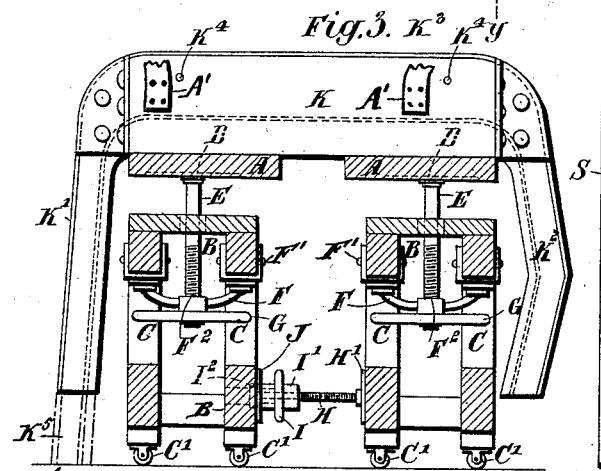
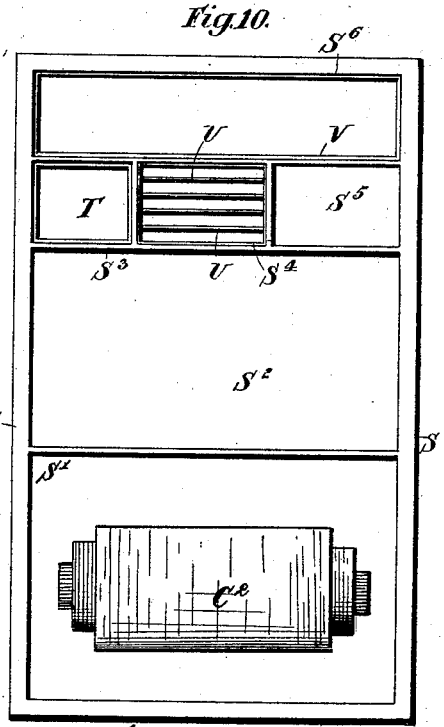

UNITED STATES PATENT OFFICE.

GEORGINA McGUIRE LAWRANCE, OF LONDON, ENGLAND.

APPARATUS FOR TREATING ANIMALS BY ELECTRICITY.

SPECIFICATION forming part of Letters Patent No. 409,470, dated August 20, 1889.

Application filed April 11, 1889. Serial No. 306,875. (No model.)

*To all whom it may concern:*

Be it known that I, GEORGINA MCGUIRE LAWRANCE, a citizen of the United States of America, and a resident of London, England, have invented certain new and useful Improved Means for Administering Electricity to and Otherwise Treating Horses and other Animals, of which the following is a specification, reference being had to the accompanying drawings.

My invention is designed to provide for administering electricity to and otherwise treating horses and other animals.

An important feature of my said invention is the provision of novel means for elevating or raising horses or other animals from the ground, and whereby the difficulties or inconveniences attending the slinging of such animals as hitherto usually practiced are obviated or greatly diminished. My said invention, moreover, comprises improved means for administering electricity to horses and other animals; and one feature of this part of my invention is the provision of a negative electrode having a very large area of contact-surface.

My said invention also comprises other improvements hereinafter set forth.

In the accompanying drawings I have shown how my said invention may be conveniently and advantageously carried into practice.

Figure 9:
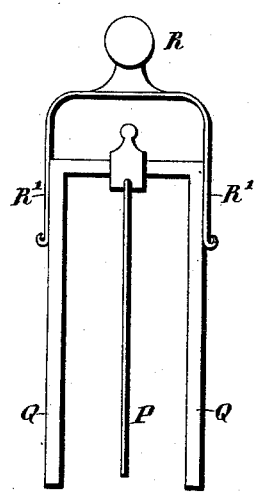
Figure 8:
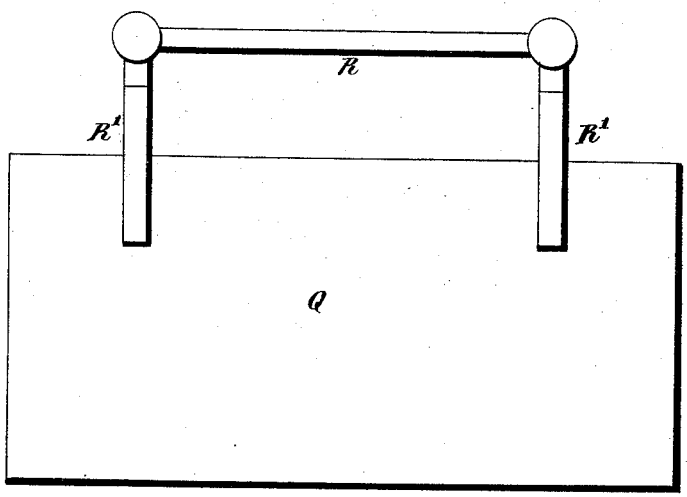
Figure 1:
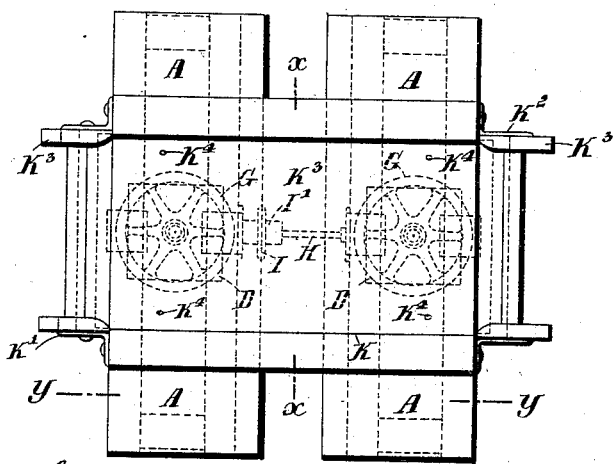

Figure 1 is a plan of my improved apparatus for elevating and supporting a horse or other animal. Fig. 2 is a transverse section on the line $x\,x$, Fig. 1; and Fig. 3 is a vertical section on the line $y\,y$, Figs. 1 and 2. Fig. 4 is a side elevation of the said apparatus, the bed, hereinafter described, being removed. Fig. 5 is a plan, and Fig. 6 is a front elevation, showing a filling-in piece, hereinafter described. Fig. 7 is a vertical central section of an improved sponge-holder, hereinafter described. Fig. 8 is a side elevation, and Fig. 9 is an end elevation, showing an improved battery element or pair of plates, hereinafter described; and Fig. 10 is a plan showing a box or case for containing the battery and other parts of the apparatus for the generation of the electric current.

Like letters indicate corresponding parts throughout the drawings.

A A are tables supported upon frames or cross-pieces B and legs C, provided with rollers or casters C'. The tables A are preferably formed of wood and are mounted upon metal plates D, provided with bosses, in which are arranged to rotate freely the upper extremities of screw-threaded spindles E.

F F are metal cross-bars or cross-pieces firmly attached by means of bolts F', or in any other suitable manner, to the frames B, and having bosses $F^2$, provided with screw-threaded holes, in which work the said screw-spindles E.

G G are hand-wheels, which are secured to the lower extremities of the spindles E, and by means of which the said spindles can be operated to raise or lower the tables A, as required.

H is another screw-threaded spindle connected at one extremity, by means of a plate or bearing H', to the frame B of one of the tables A. The screw-threaded spindle H passes through a screw-threaded hole in the boss I' of a hand-wheel I. The boss I' is connected, by means of a collar $I^2$, to a plate or bearing J, attached to the frame B of the other table A. By turning the hand-wheel I in one or the other direction the tables A may be moved toward or away from each other, the screw-threaded spindle H serving as a distance-piece for retaining the said tables firmly in any desired position.

K is a bed, which is formed of wood or other suitable non-conducting material, and for convenience is preferably constructed in two parts secured together in any convenient manner. The bed K is hollowed out to adapt it to receive and support the body of a horse or other animal.

K' $K^2$ are extensions of the bed K, against which are intended to bear the fore and hind legs, respectively, of the said horse or other animal when in position upon the said bed. The bed K and its extensions K' $K^2$ are provided with a lining $K^3$, of copper or other suitable metal which is a good conductor of electricity. This lining serves as the negative electrode. Holes $K^4$ are formed in the bed K, and through these holes are passed wires or conductors which are electrically connected to the lining $K^3$. The bed K is placed upon and supported by the tables A, as shown in Figs. 1 to 3. Beds of different sizes may be employed, in which case the tables A may be adjusted, by means of the hand-wheel I and screw H, to suit the dimensions of the said beds. $K^5$, Figs. 5 and 6, is a filling-in piece or supplemental extension of similar shape in transverse section to the extensions $K'$ $K^2$ of the bed K, and intended to take the position shown in dotted lines in Fig. 3 when the tables A and bed K are raised, as shown in this figure.

In Fig. 3 the apparatus is shown extended—that is to say, with the tables and their frames in the position which they occupy when the apparatus is ready for use. Fig. 4 shows the tables and their frames brought close together, so that the apparatus occupies less space than when extended, and can therefore be more conveniently transported or stowed away when not in use.

My improved sponge-holder (shown in Fig. 7) has a handle L, formed of wood or other suitable non-conducting material, to the lower extremity of which is attached a sponge M.

N is a disk formed of metal or other good conductor of electricity and having a rod or stem $N'$, intended to be electrically connected by a suitable wire or conductor to the positive pole of the battery. O is a set-screw or terminal for securing the said wire or conductor and the rod or stem $N'$ in the handle L.

The operation of the apparatus is as follows—that is to say, the elevating and supporting apparatus, comprising the tables A and bed K, is suitably adjusted and is placed underneath the horse or other animal, which is secured to the bed by means of broad bands $A'$ of india-rubber or other suitable non-conducting material, which are preferably strapped over the shoulders and back. The bed K is then raised by means of the hand-wheels G and screws E, and the filling-in piece or pieces $K^5$ are placed in position. The two electrodes—viz., the lining $K^3$ and the disk or plate N—being connected with the poles of the generator of electricity, the sponge M is then saturated with water or other liquid to render it a good conductor of electricity, and is applied to any desired part or parts of the horse or other animal, thus administering electricity to the latter in any desired quantity.

The electric currents may be derived from any suitable source of supply; but I prefer to employ a battery made up of elements such as that illustrated in Figs. 8 and 9, in which P is a sheet or plate of platinum, and Q Q are sheets or plates of zinc. R is a handle having steel clasps or clips $R'$, for convenience of removing the said element from the exciting-fluid in the cell.

Fig. 10 shows the general arrangement of a box or case which I prefer to employ for containing the battery and other parts of the apparatus for generating electric currents. S is the box or case, which is divided into compartments $S'$, $S^2$, $S^3$, $S^4$, $S^5$, and $S^6$. The compartment $S'$ contains an induction or intensity coil $C^2$ of any suitable description.

In the compartment $S^2$ is placed the battery. The compartment $S^3$ is fitted with a porcelain or other suitable bath T, for the purpose of containing water in which to dip the plates for cleansing purposes when removed from the cells. The compartment $S^4$ is provided with divisions U, formed of india-rubber or other suitable material, and intended to contain the different chemicals required. The compartment $S^5$ is intended to receive the plates when removed from the bath T to drain.

The compartment $S^6$ is provided with a lining V, of india-rubber or other suitable material, and is intended to receive the plates when dry after removal from the fluid in the cells and after being dipped in the bath T.

By my invention I provide in a very efficient manner for the treatment by electricity of horses or other animals suffering from rheumatism and organic diseases, enlarged joints, diseases of the blood, and the like.

It is obvious that I can somewhat modify the construction of my apparatus without departing from the nature of my invention. For instance, I can employ other means than those above described for raising and lowering the tables and the bed supported thereon or for moving the said tables toward and away from each other; or I can dispense with the means for effecting the latter operation and arrange the said tables at a suitable distance apart.

What I claim is—

1. In an apparatus for administering electricity to animals, the combination, with a vertically-adjustable bed, of supports therefor arranged beneath said bed, a boss swiveled on the frame of one support and engaging with a screw-shaft on the frame of the other, and threaded shafts for separately adjusting said supports, substantially as described.

2. In an apparatus for treating animals, the combination, with a bed concaved to support the animal underneath and having a metallic conducting-lining serving as one electrode, of means for raising said bed, and a generator of electricity connected to the lining and to a movable electrode adapted to be applied to different parts of the body, substantially as described.

3. In apparatus for treating animals, the combination, with a vertically-adjustable bed provided with extensions at its ends to support the legs and having a concave surface to receive the body, said surface lined with a conducting metal, of means for raising and lowering said bed, and supplemental extensions or filling-pieces forming continuations of the extensions attached to the ends of the bed, substantially as described.

4. In apparatus for treating animals, the combination, with a vertically-adjustable bed having a conducting metal-lined concave surface and provided with extensions attached thereto at its ends and lined with metal to support the limbs, of supports raising and lowering said table, filling-pieces or supplemental extensions, also metal-lined and forming continuations of the extensions on the bed, and a generator of electricity connected to the metal lining and to a movable body-electrode, substantially as described.

5. In apparatus for treating animals, the combination, with a vertically-adjustable bed having a concave metal-lined surface and provided with extensions depending from its ends and metal-lined to support the limbs, of independent horizontally and vertically adjustable supports arranged beneath said bed, a generator of electricity connected to the metal lining of the bed and extensions, and a movable body-electrode, substantially as described.

6. In apparatus for treating animals, the combination, with a vertically-adjustable bed having a concave metal-lined surface and provided with end extensions having continuations of said metal lining, of a generator of electricity consisting of a casing containing separate compartments for the electrolyte, for an intensity-coil, and for the battery-plates and chemicals, said plates being composed of zincs Q and platinum P, adapted to be raised and handled by a handle R, having clips R', substantially as described.

In testimony whereof I have hereunto signed my name in the presence of two subscribing witnesses.

GEORGINA McGUIRE LAWRANCE.

Witnesses:
C. OLDERSHAW,
WALTER J. SKERTEN,
*Both of 17 Gracechurch St., London, E. C.*